Patented Dec. 8, 1931.

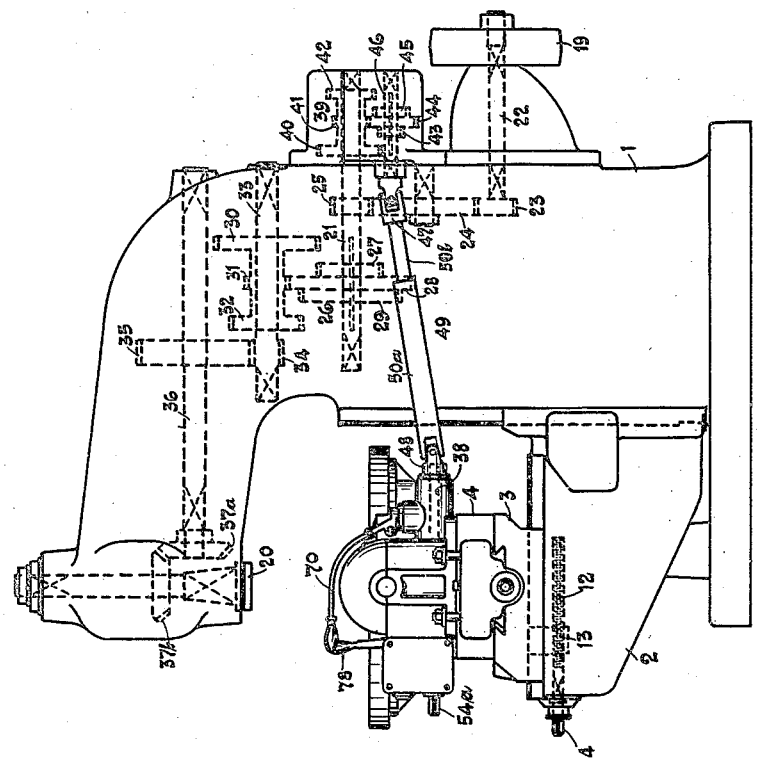

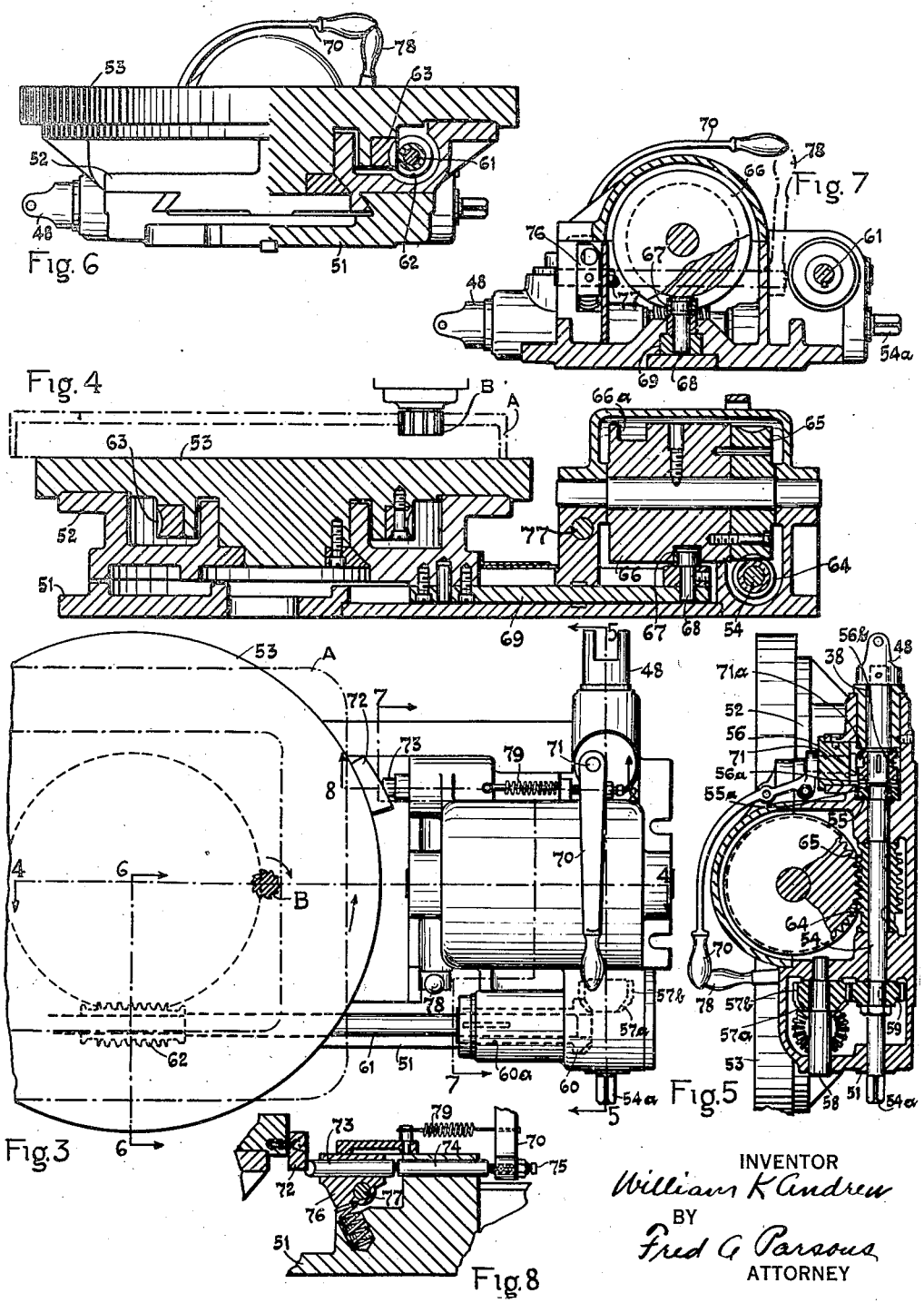

1,835,742

UNITED STATES PATENT OFFICE

WILLIAM K. ANDREW, OF WAUWATOSA, WISCONSIN, ASSIGNOR TO KEARNEY & TRECKER CORPORATION, OF WEST ALLIS, WISCONSIN

MACHINE TOOL ORGANIZATION

Application filed September 28, 1927. Serial No. 222,460.

This invention relates to machine tool construction and more particularly to milling machines.

An object is to provide a mechanism capable of producing relative movement between a tool or cutter and a work support in a predetermined path other than a straight line.

Another object is to provide improved mechanism for relative movement of a tool and a work support simultaneously in a plurality of transverse paths to produce a predetermined pattern on a work piece.

Another object is to provide improved mechanism for causing relative tool and work support movement in a predetermined path of approximately square outline.

Another object is to provide the mechanism mentioned in the form of an improved removable attachment for machine tools.

Another object is to provide improved transmission and control devices for the mechanism previously mentioned.

Another object is generally to simplify and improve the construction and operation of machine tools and attachments therefor, and still other objects will be apparent from this disclosure.

The invention consists of the particular arrangement herein illustrated described and claimed and in such modification thereof as may be equivalent to the structure claimed.

In the accompanying drawings, the same characters have been used to designate the same parts in each of the views of which:

Fig. 1 is a right side elevation of a machine tool including the invention.

Fig. 2 is a front elevation of the same machine.

Fig. 3 is an enlarged plan view of an attachment shown in Figs. 1 and 2, a portion being broken away.

Fig. 4 is a vertical section along line 4—4 of Fig. 3.

Fig. 5 is a vertical section along line 5—5 of Fig. 3.

Fig. 6 is a left side elevation of the attachment partly in section along line 6—6 of Fig. 3.

Fig. 7 is a vertical section along line 7—7 of Fig. 3.

Fig. 8 is a partial vertical section along line 8—8 of Fig. 3.

The milling machine structure includes a main frame or column member 1, a knee member 2, guided on the front wall thereof for vertical movement, a saddle member 3 guided for transverse movement on the knee, and a table member 4 guided for longitudinal movement on the saddle.

For vertical movement of knee 2 the knee has journaled therein a screw 5 engaging a nut 6, fixed in an upstanding portion 7 of the column base. The knee may be manually moved by a suitable crank, not shown, applied to the squared end 8 of a shaft 9, which is connected with the screw by the meshed bevel gears 10 and 11 fixed on the respective shafts.

For movement of saddle 3 there is provided a screw 12 journaled in the knee and engaging a nut 13 fixed in the saddle. The saddle may be manually moved by the means of a suitable crank applied to the squared end 14.

For movement of table 4 there is provided a screw 15 journaled therein and engaging a nut 16 fixed in the saddle. The table may be manually moved by the means of a suitable crank applied to the squared ends 17 or 18.

Column 1 rotatably supports a main drive pulley 19 and a tool spindle 20. Pully 19 drives a shaft 21 through a train including a shaft 22 and gears 23, 24, 25. Shaft 21 drives spindle 20 through a speed changer generally denoted by numeral 26, Fig. 1, consisting of different diametered gears 27, 28, 29, slidably keyed on the shaft and engageable one at a time with complementary gears 30, 31, 32, fixed on a shaft 33. The different speeds effected by speed changer 26 are transmitted to the spindle through a pinion 34 on shaft 33, a gear 35 on shaft 36, and bevel gears 37a on shaft 35 and 37b on the spindle 20.

The attachment previously referred to is provided with a drive shaft 38 (Figs. 1–5 etc.) which is actuated from shaft 21 through a rate changer generally denoted by numeral 39, Fig. 1, consisting of different diametered gears 40, 41, 42, fixed on shaft 21, and engaged one at a time by complementary gears 43, 44, 45, slidably keyed on a shaft 46. Fixed on shafts 46 and 38 respectively are a driving element 47 and a driven element 48 of an extensible universal joint of well known form, generally denoted by the numeral 49, and disconnectible for purposes of attachment removal either by pulling sleeve 50a off the shaft 50b with which it is slidably keyed, or by disconnecting the complementary joint elements at either end of the extensible shaft as may be readily done in the customary forms of joint shaft.

The attachment includes a base member 51 adapted to be removably secured to the machine table 4, a member 52 slidably guided thereon for movement parallel with the movement of table 4 on saddle 3, and a work table 53 rotatably mounted on the member 52. By the means of suitably timed simultaneous movements of reciprocation of support 52 and of rotation of support 53, a variety of patterns may be cut on work pieces such as A (Figs. 3 and 4) fixed on support 53, using a cutter such as B fixed on spindle 20.

In this instance, a work piece is to be finished in a form approximating a square, and transmission mechanism, as will now be described, is provided for actuating the work support 53 and the slidable member 52, the support 53 being given substantially uniform rotary motion, while the member 52 is given non-uniform reciprocatory motion. A shaft 54 is journaled in base 51 and axially aligned with shaft 38 and may be connected therewith by clutch means including a member 55 fixed on shaft 54 and a member 56 slidably keyed on shaft 38, the members being provided with complementary clutch teeth 55a and 56a engageable and disengageable by movement of member 56. For rotating the support 53, a bevel gear 57a on a shaft 58 journaled in base 51, is driven from shaft 54 by the means of meshed gears 59 and 57b. Bevel gear 57a meshes with a bevel gear 60 journaled in the base 51 and having an extended shank 60a in an axial bore of which a shaft 61 journaled in member 52 is slidably splined. Shaft 61 has fixed thereon a worm 62 engaging with a worm wheel 63 fixed with the rotary work support 53. Thus the work support may be rotated at a constant rate predetermined by the gear engagement of rate changer 39.

For reciprocating the member 52 the shaft 54 is provided with a worm 64 fixed thereon and engaging a worm wheel 65 fixed with a cam member 66 for rotation, being journaled in a suitable housing fixed on base 51, and prevented from end movement relative thereto. A cam follower in the form of a roll 67 is pivoted on a stud 68 and engages with a cam groove 66a in cam member 66. Stud 68 is fixed in a bar 69 fixed with the member 52. Thus the member 52 may be actuated at a rate in part determined by the rate changer 39 and in part by the form of the cam groove 66a, and such movement is in cycles bearing a timed relationship to the rotation or cyclic movement of support 53. Such timed relationship is dependent upon the relative ratio of the respective individual drive trains to the respective members for the number of reciprocating cycles which take place for a given number of rotative cycles, but within a given reciprocatory cycle, the relative rates of movement may be predetermined at different instants according to the form of cam groove 66a. In the present mechanism in order to finish the square form mentioned the trains are of relative ratio to give four reciprocatory movements per revolution and the cam groove is of a form productive of one corner of such square during each cam revolution.

The clutch members 55 and 56 may be manually engaged and disengaged by the means of a hand lever 70 fixed by a shaft 71, Fig. 5, having eccentrically fixed thereon a pin 71a engaging in an annular grooves 56b in the member 56. The clutch members may also be automatically disengaged at the end of the described cycle of support movement by the means of a dog 72, which contacts with a plunger 73, Fig. 8, during the revolution of the work support. Plunger 73 thrusts against a plunger 74 which thrusts against a screw 75 adjustably threaded in lever 70 whereby the dog will push the lever in a direction to disengage the clutch members 55 and 56, and stop the movement. After clutch disengagement the trip parts are in a position preventing re-engagement. To permit re-engagement while support 53 remains in the same position plunger 73 is manually moved out of contact with dog 72 as follows. Plunger 73 is carried by a member 76 fixed on a shaft 77, Figs. 7 and 8, which may be turned by the means of a hand lever 78 to drop the dog end of the plunger out of contact with the dog. The clutch members may then be re-engaged for starting a new cycle, but immediately the lever 78 is released and after the dog has moved past the plunger end, a spring 79 returns the parts to a position for plunger 73 to be again contacted to trip at the end of the cycle.

The work support may be manually actuated simultaneously in both its reciprocatory and rotary movements whenever clutch members 55 and 56 are disengaged, by the means of a suitable crank, not shown, applied to the squared end 54a of shaft 54.

For the work piece shown, in which the cutter operates on inner surfaces, it is necessary to drop the knee 2 for removing and replacing work pieces. It is also desirable to move the table 4 a little to the right in Fig. 2. After a new work piece is in place the knee and machine table are returned to cutting position, located by stops of suitable form, not shown.

In other cases it may be necessary to move the saddle 3 for changing the work piece, or the saddle and one of the other machine slides, depending upon the nature of the work piece and cutting cycle.

What is claimed is:

1. In a machine tool having a rotatable spindle, the combination of a reciprocable slide member, a work support member rotatably journaled thereon adjacent said spindle, transmission means for the simultaneous power movement of said support and slide including clutch means shiftable for simultaneously interrupting the movement of both, and a power trip operable from the movement of one of said members to shift said clutch means.

2. In a machine tool having a rotatable spindle, the combination of a work support adjacent said spindle, means for simultaneous reciprocation and rotation of said work support including clutch means for simultaneously interrupting both said movements, and a power trip for said clutch means including a dog movable with said support in at least one of said movements.

3. In an attachment for machine tools having a movable support, the combination of a base member, a slide member reciprocably guided thereon, and a work table member rotatably mounted on said slide member; and transmission mechanism therefor including a driving member having an exposed coupling end, a clutch member driven therefrom, and a plurality of transmission members simultaneously operable from said clutch member and respectively connectible with said slide and said table, all said members being portions of a device unitarily removable from and attachable to said movable support.

4. In a machine tool having a rotatable tool spindle, the combination of a work support adjacent said spindle and means for the simultaneous rotation and reciprocation of said support including a drive train having a rate changer and connectible for support rotation, and a cam device connectible for support reciprocation from said rate changer.

5. A machine tool as specified in claim 4 including clutch means operable for simultaneously interrupting both the reciprocatory and rotary motion of said support, and trip means for said clutch means and operable in accordance with movement of said support.

6. In a machine tool having a rotatable tool spindle, and a rotatable work support adjacent said spindle, the combination of transmission mechanism including clutch means engageable to connect said transmission for support rotation, trip means for disengaging said clutch means including a dog element movable in unison with said support and an element normally connected for movement during the engagement of said clutch means into a position to be contacted by said dog, and means operable independently of said clutch means to move one of said elements to avoid contact with the other.

7. In a machine tool having a tool support and a work support the combination of means for actuation of one of said supports in simultaneous rotary and reciprocatory movements having predetermined relative periods, said means including a rate changer for simultaneously altering the period of each of said movements.

8. In a machine tool having a tool support and a work support, the combination of means for actuation of one of said supports in simultaneous rotary and reciprocatory movements having predetermined relative periods, said means including a clutch device shiftable for simultaneously interrupting both said movements.

9. In a machine tool having a tool support and a work support, the combination of means for actuation of one of said supports simultaneously in rotary and reciprocatory movements, said means including a cam for predetermining the relative period of said movements, a rate changer predeterminative of the total period of both said movements, clutch means shiftable for simultaneously interrupting both said movements, and a trip operative in accordance with one of said movements to shift said clutch means.

10. A machine tool comprising a work support and a tool support, means for simultaneous different relative movements thereof including a clutch member shiftable for simultaneous control of both said different movements, a plurality of relatively movable trip elements one of which is normally movable into the path of movement of the other in accordance with the shifting of said clutch member, and means for movement of one of said elements out of said path independently of the shifting of said clutch member.

11. A machine tool comprising a work support and a tool support, and means for actuation of one of said supports including a drive member connected for simultaneous rotative and reciprocatory movements having predetermined relative periods, a power source connectible with said drive member through a train including shiftable clutch means, and a manually operable element connected with said drive member exclusive of said clutch means.

In witness whereof I hereto affix my signature.

WILLIAM K. ANDREW.